June 12, 1945.   M. MONIES   2,378,093

MEASURING DEVICE

Filed April 26, 1943

INVENTOR
MARC MONIES
BY
ATTORNEY

Patented June 12, 1945

2,378,093

UNITED STATES PATENT OFFICE 2,378,093

MEASURING DEVICE

Marc Monies, New York, N. Y.

Application April 26, 1943, Serial No. 484,548

3 Claims. (Cl. 33—147)

This invention relates to measuring devices, and particularly to micrometers, calipers, precision indicators, gauges and other instruments of the type containing two axially aligned spaced abutment members adapted for coaction as measuring means for work placed therebetween.

In conventional devices of the above-referred-to category, it is generally customary to have one of the abutment members movable, so that the distance between both co-axial members may be varied for a proper dimensional determination of the work therebetween. For example, in a conventional micrometer, there is a stationary abutment member, generally in the form of a short pin or spindle, and in coactive relation therewith is a movable abutment member associated with a micrometer screw. In the use of such a conventional device, it has frequently been found that there are inaccuracies in reading due to variations in pressure exerted during the manipulation of the movable member. For example, if in measuring the diameter of a rod placed between both coacting members considerable pressure were applied in operatively actuating the micrometer screw, the reading would be less than if comparatively less pressure were exerted, on account of the yieldability or compressibility of the work being measured or of the instrument itself.

It is one of the primary objects of this invention to obviate the danger of inaccuracies due to the above-mentioned causes by providing easily readable indicating means whereby a reading is taken only when such indicating means will be brought to a predetermined position, which can be predetermined by any suitable preliminary test. By the method of my invention it is hence possible to obviate the method conventionally employed of guessing at the pressure to be applied to the moving element, such as a micrometer screw, which pressure is generally released and the reading taken only when the operator's "feel" or touch sensitivities indicate that this should be done. The use of my invention further eliminates inaccuracies in the taking of readings when the same measuring device is operatively manipulated by different persons who may be accustomed to apply different pressures to the moving element.

And in the above aspect of my invention it is a further object to enable the same pressure at all times to be applied by the movable member, such as a micrometer screw, against the work to be measured, so as to insure uniformly accurate readings by any person or persons operating the device.

It is a further object of my invention to enable measurements to be taken with less time and effort than would be required with conventional devices of this category, inasmuch as no time would be lost in manipulating the movable element until the operator might be satisfied that the proper pressure is being applied. With my invention no such prolonged manipulation is necessary, inasmuch as the movable element is merely actuated until the indicator reaches a predetermined mark.

It is also within the contemplation of my invention to enable a device of the above-described character to serve as a comparator, whereby minute differences between work of a predetermined standard size and work in process may readily be determined. This objective is accomplished by employing the same indicating means above-referred-to, but employed in connection with a scale suitably calibrated for the purpose.

It is an important object of this invention to provide a device capable of performing the above-referred-to functions and attaining the said objectives without the use of complex mechanisms, and particularly without the employment of gears, intricate linkage or bulky construction. This objective is accomplished by the use of the hydraulic press principle employing Pascal's law. And in this aspect of my invention it is an object to permit a movement of the abutment member that is stationary in a conventional instrument and to so magnify such movement that it will be reflected by the indicator in readily readable form.

And it is a further object of this invention to enable the use of liquid means in a device of this category without employing capillary tubes, gases or other substances capable of breakage or leakage or requiring delicate handling.

Other objects, advantages and features will appear from the drawing and the description hereinafter given.

Referring to the drawing.

Figure 1:
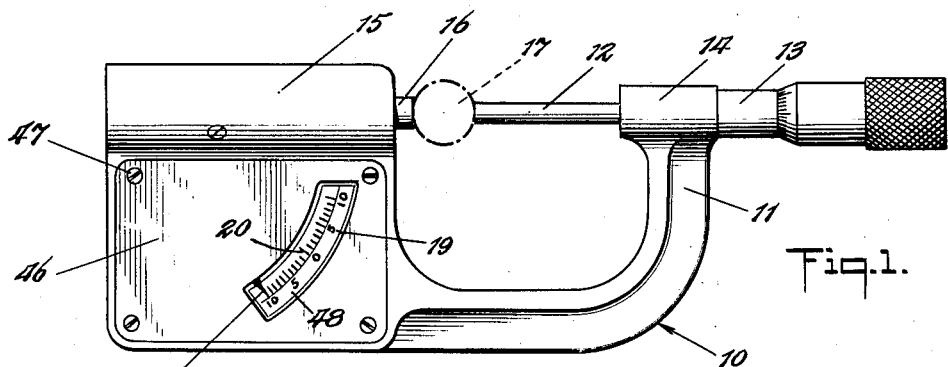
Figure 1 is a side elevation of the measuring device of my invention shown in the form of a micrometer.

The form of my invention illustrated in the drawing is a micrometer containing a handle portion in the form of a yoke 10, a bracket 11 supporting the movable element or abutment member 12 operatively associated with the micrometer screw 13. Co-axial with the housing 14 of bracket 11 is the housing 15 associated with the opposite portion of the yoke 10, said housing slidably supporting an abutment member 16 co-axial with member 12 and adapted for coaction therewith for measuring a piece of work, such as the object 17, placed therebetween. The abutment member 16, instead of being stationary as in conventional types of micrometers, is movable within limits, upon the slightest pressure, as will more clearly hereinafter appear—this movement being transmitted through a fluid to pointer 18 whose movement is considerably magnified, all in a manner to be more clearly hereinafter set forth. The person taking the reading operatively actuates the micrometer screw 13 in conventional manner, thereby causing a movement of member 12 towards member 13. When the work 17 is in contact with both of said members, the member 16 will be urged inwardly, the pointer 18 being forced to move along the scale 19 until the marking 20 is reached. This marking represents the point at which the reading is to be taken.

The housing 15 is preferably, although not necessarily, cylindrical in form, and contains therein a hollow casing 21 the internal chamber 22 of which is preferably in axial alignment with the member 16. The chamber 22 serves as a reservoir and contains some suitable fluid 22a, such as mercury; and such fluid is kept confined with chamber 22 preferably by a diaphragm 23 suitably attached to casing 21, as well as by the sealed apertures through which the small piston 24 and the volume control finger 25 move, as will hereinafter appear. Disposed within the chamber 22, against the inner portion of the diaphragm 23, is the large piston 26, said piston being maintained in position, in the form illustrated, by the pressure of the liquid 22a thereagainst, said liquid filling the entire chamber 22.

The housing 15 contains the hollow internal portion or chamber 27 which is bounded on one side by the diaphragm 23 and on the other side by the wall 28. The hollow portion 27 is in effect a cylinder within which the plunger 29 is movable, the plunger being associated with the abutment member 16, the opposite end of the plunger containing the centrally disposed extension 30 in engagement with the said diaphragm 23. In the form illustrated, the abutment member 16 and plunger 29 are shown as a unitary structure constituting what in effect is a push rod engageable with the said diaphragm 23.

The small piston 24 contains at the outside of casing 21 an expanded portion 31, preferably in the form of a disc, containing an axial boss 32 extending rearwardly therefrom. In spaced relation to said boss is stop member 33, preferably in the form of a rod or stud the rear portion of which is in threaded engagement with the threaded portion 34 of the rear wall 35 of housing 15. Said stud is rotatably manipulable in conventional manner by a suitable instrument that could be inserted substantially at portion 36 thereof, to vary the distance between the forward end 37 of the stud and the rear end 38 of boss 32. The position of the stud 33 can be fixed by suitably manipulating the lock nut 39, which can be accomplished before the parts are assembled in place. Mounted over stud member 33 and boss 32 is the helical spring 40, said spring being in abutment with the forward portion of wall 35 and the rear portion of disc 31, thereby constantly urging the small piston 24 forwardly into its innermost or initial position.

The lower portion of disc 31 is provided with a finger 41 which is operatively engageable with the short arm 42 of the lever pointer 43 pivotally mounted at 43a. The said pointer is disposed within recessed portion 44 of the lower framework or housing 45, which is preferably flat and which joins the underside of cylindrical framework or housing 15—said recessed portion containing a cover plate 46 attached to the casing 45 by fasteners 47. The cover is also provided with an apertured portion 48 through which the scale 19, suitably contained within recess 44, is visible.

As aforesaid, the volume control finger 25 extends into the chamber 22, the lower portion of said finger being connected to a screw member 50 in threaded engagement with the hole 51 in the lower portion of housing 15. Said screw can be rotatably manipulated, in conventional manner, by means of a tool inserted at 52 to cause an upward or downward movement of the finger 25, for reasons to be hereinafter set forth.

In order to prevent a leakage of the fluid 22a, the rear portion of the casing 21 is preferably, although not necessarily, provided with the plate 53 holding the packing 54 in place in the manner shown. The said plate 53 is attached to casing 21 by the fasteners 55. Likewise, the lower portion of casing 21 is provided with packing 56 surrounding the finger 25.

Figures 2, 3, 4:
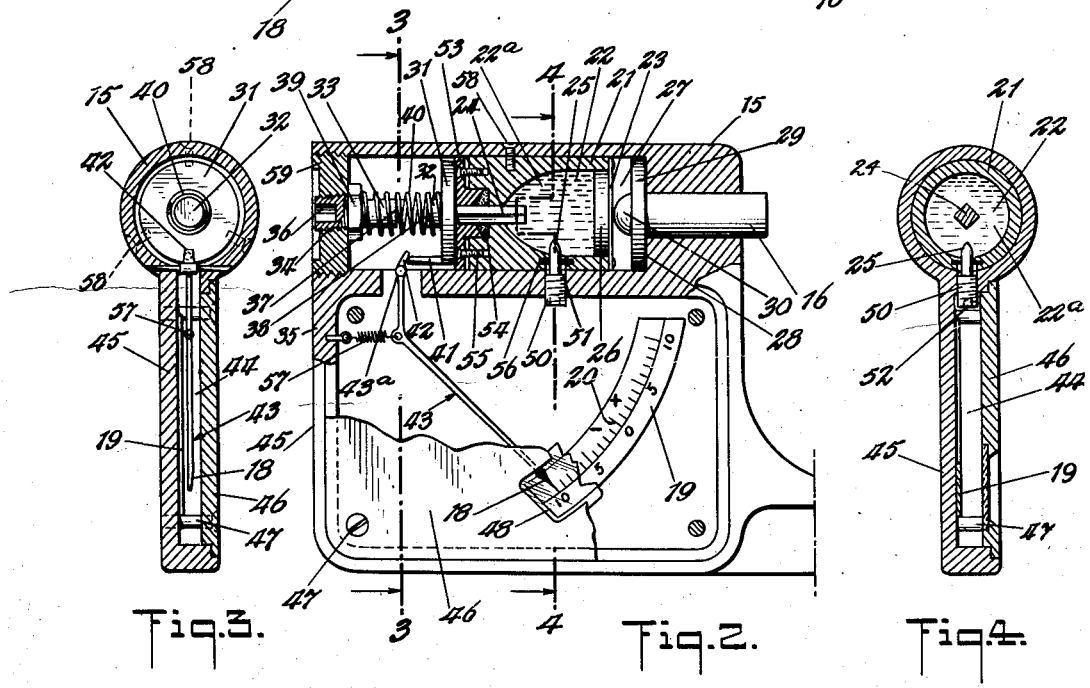
Figure 2 is a fragmentary longitudinal section of the device of Figure 1.
Figure 3 is a vertical section of Figure 2 taken substantially along line 3—3 thereof.
Figure 4 is a vertical section of Figure 2 taken along line 4—4 thereof.
Figure 5:
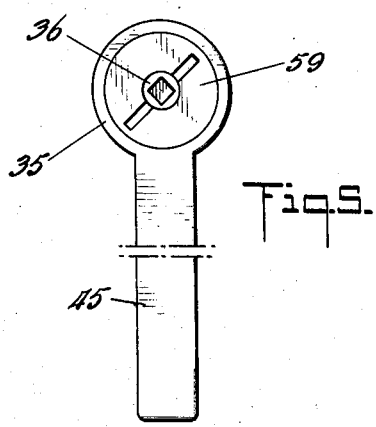
Figure 5 is a rear end view of the device of Figures 1 and 2.

In the operation of this device, the work 17 is placed between abutment members or spindles 12 and 16, as aforesaid. The micrometer screw is manipulated until member 12 is in engagement with the work, and the work with abutment member 16. In the initial position, the pointer 43 will be maintained by the spring 57 in its initial position, which in Figure 2 is the lowest position. As the pressure of member 12 is being applied against the work, and this pressure is transmitted to member 16, the extension 30 will bear up against the diaphragm 23 and force the large piston 26 rearwardly into the cylinder— the pressure being transmitted through the fluid 22a to the small piston 24. Due to the difference in cross-sectional areas of pistons 26 and 24, a small movement of large piston 26 will result in a correspondingly greater movement of small piston 24. Although a diaphragm 23 is here employed separating the plunger 29 from the piston 26, this invention is not to be limited to such a construction, inasmuch as the plunger 29 and piston 26 can be directly connected in obvious manner.

The outward movement of the small piston, and the associated disc 31, will cause the finger 41 to actuate arm 42, against the action of spring 57, and force the pointer 43 upwardly. In the preferred form illustrated, arm 42 is much shorter than the opposite or indicating arm of the pointer, thus effectuating a further magnification of the movement of member 16. The said upward movement of the piston is continued until the said pointer 43 reaches the mark 20 on the scale 49. At this point the reading of the micrometer screw is taken, the reading indicating the correct measurement of the work in view of the fact that mark 20, indicated 0 on the scale, had been previously calibrated with respect to a gauge of standard dimensions, or by other suitable calibrating means. It is thus apparent that no individual measuring experience is necessary for the operation of this device, inasmuch as the position of pointer 43, and not the "feel" of the operator, determines the point at which the reading must be taken.

In order to adjustably limit the movement of pointer 43, the space between terminals 37 and 38 of stop 33 and boss 32, respectively, can be varied. For example, the maximum upward movement of pointer 43 can be reduced by reducing the space between the said members—thereby preventing an unduly large movement of said pointer. It is obvious that when the boss 32 engages the stop 33, no further movement of the pointer is possible.

Should there be any change in the volume of the liquid 22a within chamber 22, due to leakage, expansion or contraction, the volume control finger 25 can be raised or lowered, in the manner aforesaid, to permit the proper positioning and functioning of pistons 26 and 24, and keep the chamber at all times filled with the said fluid.

In the event it is desired to use this device as a comparator, the reading of a given standard piece of work can be taken with the pointer 43 at mark 20, indicated 0 on the scale; and thereafter readings can be taken of other pieces of work whose dimensions are to be compared with the standard piece. The scale 19 can be suitably calibrated, and the movement of the pointer up or down will then indicate the plus or minus dimensional differences. In this manner this device can be used as a gauge for work of predetermined tolerances.

It will be observed that the device is compact in form, and easily assembled. The fasteners 58 removably maintain the casing 21 in place, and upon an unscrewing of the plug 59, the casing can be withdrawn. The entire housing 15, together with the flat lower portion 45, occupy a minimum of space and provide a well balanced and conveniently manipulable device.

Although my invention is shown in the form of a micrometer, it is also equally adaptable for other instruments employing abutment members like 12 and 16 at least one of which is movable, such as outside calipers, precision indicators, gauges and the like.

It is understood that the embodiment above described and shown in the drawing is merely illustrative of my invention, and that numerous changes and modifications may be made therein within the scope of the appended claims without departing from the spirit of this invention.

What I claim is:

1. In a measuring device the combination of a movable anvil and a hydraulic indicator device comprising, a chamber, a selected liquid therein, two pistons movably disposed within said chamber, one being of comparatively greater cross-sectional area than the other, a flexible diaphragm at one side of said chamber, the larger piston being held in engagement with the inner wall of the diaphragm by the liquid within the chamber, plunger means outside of the chamber and associated with said movable anvil and abuttable with said diaphragm for forcing it into the chamber when the movable anvil is operatively moved inwardly, whereby the movement will be transmitted to the larger piston to cause a correspondingly greater movement of the smaller piston by hydraulic pressure, and indicating means operatively connected to said smaller piston.

2. In a measuring device the combination of a movable anvil and a hydraulic indicator device comprising, a chamber, a selected liquid therein, two pistons movably disposed within said chamber, one being of comparatively greater cross-sectional area than the other, actuating means operatively associated with said movable anvil and the larger of said pistons, whereby a movement of the anvil will be transmitted to the larger piston to cause a correspondingly greater movement of the smaller piston by hydraulic pressure, the smaller piston slidably extending through one wall of the chamber and containing at the exterior portion thereof an enlarged portion engageable with the outer surface of the said wall when the smaller piston is in its innermost position within the chamber, the outer surface of said enlarged portion containing an axial boss, adjustable stop means comprising a stud in substantial axial alignment with said boss and in spaced relation thereto when the smaller piston is in its said innermost position, said boss being abuttable with said stud when the smaller piston is in a predetermined outermost position, supporting means in threaded engagement with said stud for enabling the position of the stud with respect to the boss to be adjustably varied, and indicating means operatively connected to said smaller piston.

3. In a measuring device the combination of a movable anvil and a hydraulic indicator device comprising, a plunger attached to said anvil, a housing for said plunger, a hollow casing within the housing, a selected liquid within the casing, a flexible diaphragm at one side of the casing, two pistons movably disposed within said casing, one being of comparatively greater cross-sectional area than the other, the larger piston being held in engagement with the inner wall of the diaphragm by the liquid within the casing, the smaller piston slidably extending through a wall in the chamber to the exterior thereof, said plunger containing an axial extension abuttable with the diaphragm, the operative inward movement of the plunger being adapted to force the said diaphragm against the larger piston to cause a correspondingly greater movement of the smaller piston by hydraulic pressure, a movable pointer adapted to be operatively engaged by the exterior portion of the smaller piston, and a scale in coactive relation to said pointer.

MARC MONIES.